United States Patent
Ito et al.

(10) Patent No.: US 9,879,872 B2
(45) Date of Patent: Jan. 30, 2018

(54) AIR-CONDITIONING MANAGEMENT DEVICE, AIR-CONDITIONING MANAGEMENT METHOD, AND PROGRAM

(75) Inventors: Takahiro Ito, Tokyo (JP); Shigeki Suzuki, Tokyo (JP); Noriyuki Komiya, Tokyo (JP); Taichi Ishizaka, Tokyo (JP); Takeru Kuroiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 624 days.

(21) Appl. No.: 14/399,995

(22) PCT Filed: Jun. 15, 2012

(86) PCT No.: PCT/JP2012/065431
§ 371 (c)(1),
(2), (4) Date: Nov. 10, 2014

(87) PCT Pub. No.: WO2013/186932
PCT Pub. Date: Dec. 19, 2013

(65) Prior Publication Data
US 2015/0142179 A1  May 21, 2015

(51) Int. Cl.
F24F 11/00 (2006.01)
G05B 13/02 (2006.01)
G05B 13/04 (2006.01)

(52) U.S. Cl.
CPC .......... *F24F 11/001* (2013.01); *F24F 11/006* (2013.01); *G05B 13/026* (2013.01); *G05B 13/048* (2013.01); *F24F 2011/0058* (2013.01); *F24F 2011/0063* (2013.01)

(58) Field of Classification Search
None
See application file for complete search history.

(56) References Cited

U.S. PATENT DOCUMENTS

2012/0083927 A1   4/2012   Nakamura et al.

FOREIGN PATENT DOCUMENTS

| JP | 2003-050037 A | 2/2003 |
| JP | 2004-020019 A | 1/2004 |
| JP | 2004-116820 A | 4/2004 |
| JP | 2010-065960 A | 3/2010 |
| JP | 2012-080679 A | 4/2012 |
| SG | 179328 A1 | 4/2012 |
| WO | 2007/128783 A1 | 11/2007 |

OTHER PUBLICATIONS

Office Action dated Jan. 22, 2017 issued in corresponding CN patent application No. 201280073958.2 (and English translation).
(Continued)

*Primary Examiner* — Qing Wu
(74) *Attorney, Agent, or Firm* — Posz Law Group, PLC

(57) ABSTRACT

A standard schedule creator creates a standard schedule that makes it possible to achieve a target presented by target data. A seasonal schedule updater, monthly schedule updater, weekly schedule updater, and current day schedule updater update the created standard schedule using the corresponding weather forecast data to create an operation schedule of an air conditioner in which the weather forecast is properly reflected.

13 Claims, 16 Drawing Sheets

(56) References Cited

OTHER PUBLICATIONS

International Search Report of the International Searching Authority dated Sep. 18, 2012 for the corresponding international application No. PCT/JP2012/065431 (and English translation).

Japanese Office Action dated Oct. 6, 2015 in the corresponding Japanese application No. 2014-521094. (Partial translation attached).

Office Action dated Aug. 17, 2017 issued in corresponding GB patent application No. 1420269.1.

FIG. 3

AVERAGE TEMPERATURE DATA

|  | HIGHEST TEMPERATURE (°C) | LOWEST TEMPERATURE (°C) |
|---|---|---|
| JANUARY 1ST | 10.4 | 2.9 |
| JANUARY 2ND | 10.3 | 2.8 |
| JANUARY 3RD | 10.2 | 2.7 |
| JANUARY 4TH | 10.1 | 2.6 |
| ⋮ | ⋮ | ⋮ |
| DECEMBER 31ST | 10.7 | 3.0 |

FIG. 4A

AIR CONDITIONER SET TEMPERATURE

| LOWEST OUTDOOR TEMPERATURE | 16 | 17 | ... | 21 | 22 |
|---|---|---|---|---|---|
| 0 | 7.8 | 8.0 | ... | 8.8 | 9.0 |
| 1 | 7.6 | 7.8 | ... | 8.6 | 8.8 |
| 2 | 7.4 | 7.6 | ... | 8.4 | 8.6 |
| : | ... | ... | ... | ... | ... |
| 15 | 4.8 | 5.0 | ... | 5.8 | 6.0 |
| 16 | — | 7.8 | ... | 5.6 | 5.8 |
| 17 | — | — | ... | 5.4 | 5.6 |

POWER CONSUMPTION PER DAY
(HEATING OPERATION: UNIT kwh)

FIG. 4B

AIR CONDITIONER SET TEMPERATURE

| HIGHEST OUTDOOR TEMPERATURE | 24 | 25 | ... | 28 | 29 |
|---|---|---|---|---|---|
| 28 | 7.0 | 6.6 | ... | — | — |
| 29 | 7.4 | 7.0 | ... | 5.8 | — |
| 30 | 7.8 | 7.4 | ... | 6.2 | 5.8 |
| : | ... | ... | ... | ... | ... |
| 36 | 10.2 | 9.8 | ... | 8.6 | 8.2 |
| 37 | 10.6 | 10.2 | ... | 9.0 | 8.6 |
| 38 | 11.0 | 10.6 | ... | 9.4 | 9.0 |

POWER CONSUMPTION PER DAY
(AIR-CONDITIONING OPERATION: UNIT kwh)

FIG. 5A

SCHEDULE DATA (DAILY)

|  | AVAILABLE ELECTRIC ENERGY (kwh) |
|---|---|
| JANUARY 1ST | 7.2 |
| JANUARY 2ND | 7.0 |
| JANUARY 3RD | 7.0 |
| JANUARY 4TH | 7.0 |
| : | : |
| DECEMBER 31ST | 10.7 |

FIG. 5B

SCHEDULE DATA (CURRENT DAY)

|  | AVAILABLE ELECTRIC ENERGY (kwh) |
|---|---|
| 0:00 TO 3:00 | 0 |
| 3:00 TO 6:00 | 0 |
| 6:00 TO 9:00 | 1.8 |
| 9:00 TO 12:00 | 2.0 |
| 12:00 TO 15:00 | 3.1 |
| 15:00 TO 18:00 | 2.9 |
| 18:00 TO 21:00 | 1.9 |
| 21:00 TO 24:00 | 0.5 |

FIG. 6A

WEATHER FORECAST DATA (THREE MONTHS)

| | APRIL (%) | | | MAY (%) | | | JUNE (%) | | |
|---|---|---|---|---|---|---|---|---|---|
| TEMPERATURE | LOW | AVERAGE | HIGH | LOW | AVERAGE | HIGH | LOW | AVERAGE | HIGH |
| | 30 | 40 | 30 | 20 | 40 | 40 | 20 | 40 | 40 |

FIG. 6B

WEATHER FORECAST DATA (ONE MONTH)

| | FIRST WEEK OF APRIL (%) | | | SECOND WEEK OF APRIL (%) | | | THIRD AND FOURTH WEEKS OF APRIL (%) | | |
|---|---|---|---|---|---|---|---|---|---|
| TEMPERATURE | LOW | AVERAGE | HIGH | LOW | AVERAGE | HIGH | LOW | AVERAGE | HIGH |
| | 20 | 30 | 50 | 60 | 40 | 10 | 30 | 40 | 30 |

FIG. 6C

WEATHER FORECAST DATA (ONE WEEK)

| DATE | APRIL 1ST | APRIL 2ND | APRIL 3RD | APRIL 4TH | APRIL 5TH | APRIL 6TH | APRIL 7TH |
|---|---|---|---|---|---|---|---|
| RELIABILITY | A | A | A | B | C | C | C |
| HIGHEST TEMPERATURE (°C) | 18 | 19 | 18 | 16 | 16 | 15 | 20 |
| LOWEST TEMPERATURE (°C) | 11 | 10 | 10 | 9 | 9 | 10 | 10 |

FIG. 6D

WEATHER FORECAST DATA (CURRENT DAY)

| DATE & TIME | APRIL 1ST | | | | | | | |
|---|---|---|---|---|---|---|---|---|
| | 0:00 | 3:00 | 6:00 | 9:00 | 12:00 | 15:00 | 18:00 | 21:00 |
| TEMPERATURE (°C) | 12 | 11 | 11 | 15 | 17 | 20 | 18 | 15 |

FIG. 9A

AIR CONDITIONER SET TEMPERATURE

| LOWEST OUTDOOR TEMPERATURE | 16 | 17 | ... | 21 | 22 |
|---|---|---|---|---|---|
| 0 | ... | ... | ... | 41 | 12 |
| 1 | ... | ... | ... | 42 | 13 |
| 2 | ... | ... | ... | 43 | 14 |
| : | ... | ... | ... | ... | ... |
| 15 | ... | ... | ... | 56 | 27 |
| 16 | ... | ... | ... | 57 | 28 |
| 17 | ... | ... | ... | 58 | 29 |

PRIORITY IN RESPECIFYING OPERATION CONDITIONS
(HEATING OPERATION)

FIG. 9B

AIR CONDITIONER SET TEMPERATURE

| HIGHEST OUTDOOR TEMPERATURE | 24 | 25 | ... | 28 | 29 |
|---|---|---|---|---|---|
| 28 | 11 | 40 | ... | ... | ... |
| 29 | 10 | 39 | ... | ... | ... |
| 30 | 9 | 38 | ... | ... | ... |
| : | ... | ... | ... | ... | ... |
| 36 | 3 | 32 | ... | ... | ... |
| 37 | 2 | 31 | ... | ... | ... |
| 38 | 1 | 30 | ... | ... | ... |

PRIORITY IN RESPECIFYING OPERATION CONDITIONS
(AIR-CONDITIONING OPERATION)

TARGET VALUE FOR JUNE THROUGH AUGUST: 500 kwh

FIG. 13

| TEMPERATURE FORECAST | | | AVERAGE VALUE CORRECTION | | | |
|---|---|---|---|---|---|---|
| LOW | AVERAGE | HIGH | DIFFERENCE | VARIATION OF DIFFERENCE | RANGE | CORRECTION VALUE |
| 100 | 0 | 0 | −2.00 | −0.00 | −2.00～−2.00 | −2.00 |
| 90 | 10 | 0 | −2.00 | +0.10 | −2.00～−1.90 | −1.95 |
| 90 | 0 | 10 | −2.00 | +0.20 | −2.00～−1.80 | −1.90 |
| 80 | 20 | 0 | −2.00 | +0.20 | −2.00～−1.80 | −1.90 |
| 80 | 10 | 10 | −1.75 | +0.30 | −1.75～−1.45 | −1.60 |
| 80 | 0 | 20 | −1.50 | +0.40 | −1.50～−1.10 | −1.30 |
| : | : | : | : | : | : | : |
| 60 | 30 | 10 | −1.25 | +0.50 | −1.25～−0.75 | −1.00 |
| : | : | : | : | : | : | : |
| 30 | 40 | 30 | 0.00 | 0.00 | −0.00～−0.00 | 0.00 |
| : | : | : | : | : | : | : |
| 20 | 40 | 40 | +0.50 | −0.80 | −0.30～+0.50 | +0.10 |
| : | : | : | : | : | : | : |
| 20 | 30 | 50 | +0.75 | −0.70 | +0.05～+0.75 | +0.40 |
| : | : | : | : | : | : | : |
| 10 | 40 | 50 | +1.00 | −0.60 | −0.40～+1.00 | +0.70 |
| : | : | : | : | : | : | : |

_US 9,879,872 B2_

AIR-CONDITIONING MANAGEMENT DEVICE, AIR-CONDITIONING MANAGEMENT METHOD, AND PROGRAM

CROSS REFERENCE TO RELATED APPLICATION

This application is a U.S. national stage application of International Application No. PCT/JP2012/065431 filed on Jun. 15, 2012, the disclosure of which is incorporated herein by reference.

TECHNICAL FIELD

The present disclosure relates to an air-conditioning management device, air-conditioning management method, and program.

BACKGROUND ART

From the viewpoint of energy saving, it is a known practice to set a target for the reduction amount or reduction rate in the annual or monthly power usage and control the operation of an air conditioner so as to achieve the target.

For example, Patent Literature 1 describes creation of an air conditioner control schedule that makes it possible to achieve the annual target of the power usage in consideration of weather forecast.

CITATION LIST

Patent Literature

Patent Literature 1: Unexamined Japanese Patent Application Kokai Publication No. 2004-20019.

SUMMARY OF INVENTION

Technical Problem

The Patent Literature 1 creates an air conditioner control schedule in consideration of weather forecast. However, no specific approach to create a control schedule from weather forecast is apparent and it is difficult to create a proper target-achievable schedule.

The present disclosure is made with the view of the above situation and an objective of the disclosure is to provide an air-conditioning management device, air-conditioning management method, and program making it possible to create a proper air conditioner operation schedule from weather forecast.

Solution to Problem

In order to achieve the above objective, the air-conditioning management device of the present disclosure comprises:

target setting means setting a target for the energy used by an air conditioner for a given period;

standard schedule creation means creating a standard operation schedule of the air conditioner that makes it possible to achieve the target set by the target setting means;

weather forecast data acquisition means acquiring multiple weather forecast data for different forecast periods; and schedule update means updating the standard schedule using the acquired multiple weather forecast data in the order of forecast period from the longest.

Advantageous Effects of Invention

The present disclosure creates an air conditioner operation schedule from multiple pieces of weather forecast for different forecast periods, making it possible to create a proper schedule in which the weather forecast is reflected.

BRIEF DESCRIPTION OF DRAWINGS

FIG. 3 is a chart showing an example of the average temperature data;

FIG. 4A is a chart (No. 1) showing an example of the electric energy calculation reference table;

FIG. 4B is a chart (No. 2) showing an example of the electric energy calculation reference table;

FIG. 5A is a chart showing an example of the daily schedule data;

FIG. 5B is a chart showing an example of the current day schedule data;

FIG. 6A is a chart showing an example of the weather forecast data (three months);

FIG. 6B is a chart showing an example of the weather forecast data (one month);

FIG. 6C is a chart showing an example of the weather forecast data (one week);

FIG. 6D is a chart showing an example of the weather forecast data (current day);

FIG. 9A is a chart (No. 1) showing an example of the table defining the priority for determining the order to respecify the operation conditions;

FIG. 9B is a chart (No. 2) showing an example of the table defining the priority for determining the order to respecify the operation conditions;

FIG. 13 is a chart showing an example of the table that is referred to for correcting the temperature;

DESCRIPTION OF EMBODIMENTS

An embodiments of the present disclosure will be described in detail hereafter with reference to the drawings. In the figures, the same or corresponding components are referred to by the same reference numbers.

An air-conditioning management device 10 according to an embodiment of the present disclosure will be described.

Figure 1:
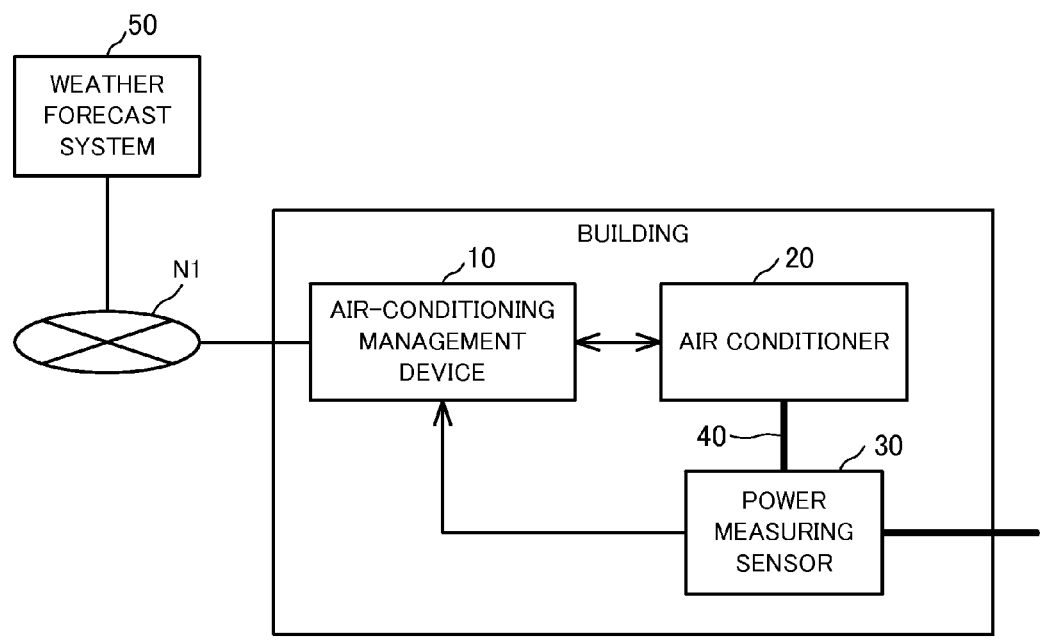
FIG. 1 is a diagram showing a system configuration including the air-conditioning management device according to an embodiment of the present disclosure.

The air-conditioning management device 10 is a system for managing the operation of an air conditioner 20 installed in a building. The air-conditioning management device 10 is connected to the air conditioner 20 as a management target and a power measuring sensor 30 as shown in FIG. 1. The power measuring sensor 30 is installed on a power line 40 connecting the air conditioner 20 and a not-shown power source, and measures the power consumption of the air conditioner 20 as needed. The air-conditioning management device 10 is further connected to an external weather forecast system 50 via a network N1 such as the Internet. The weather forecast system 50 periodically forecasts the weather in the area where the building in which the air conditioner 20 is installed is located.

Figure 2:
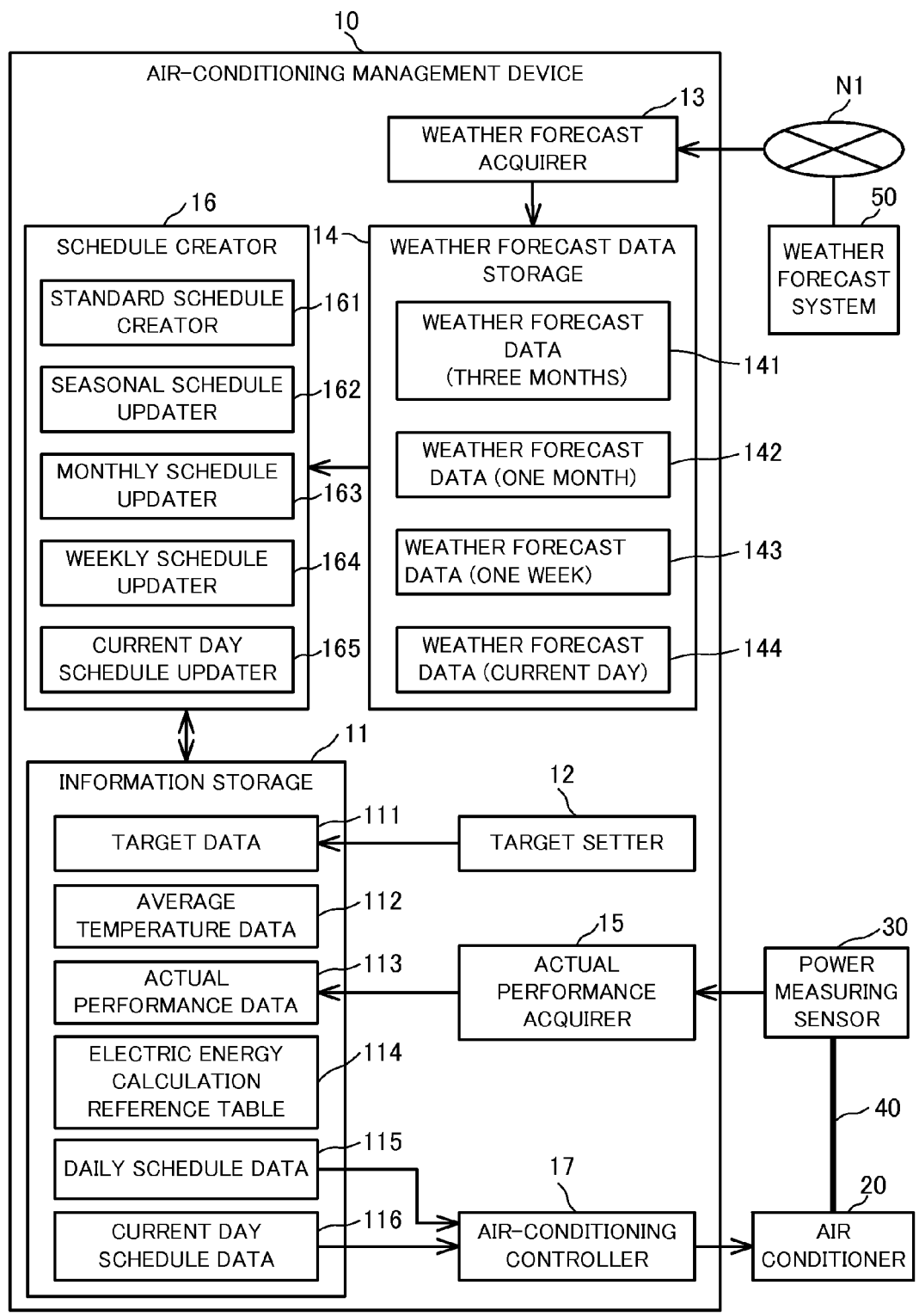
FIG. 2 is a block diagram showing the configuration of the air-conditioning management device according to the embodiment of the present disclosure.

The air-conditioning management device 10 is a computer such as an air-conditioning controller, and comprises a communication interface, a RAM (random access memory), a ROM (read only memory), a CPU (central processing unit), a hard disc drive, a liquid crystal display, operation buttons, and the like. The air-conditioning management device 10 functionally comprises, as shown in FIG. 2, an information storage 11, a target setter 12, a weather forecast acquirer 13, a weather forecast data storage 14, an actual performance acquirer 15, a schedule creator 16, and an air-conditioning controller 17.

The information storage 11 stores various data, tables, and the like that are necessary for the air-conditioning management device 10 to create a schedule of the air conditioner 20. More specifically, the information storage 11 stores target data 111, average temperature data 112, actual performance data 113, an electric energy calculation reference table 114, daily schedule data 115, and current day schedule data 116.

The target data 111 are data presenting the annual target power usage of the air conditioner 20.

The average temperature data 112 are data presenting the average highest temperature and lowest temperature of each calendar day in multiple years in the past (for example, the past 30 years) as shown in FIG. 3. The average temperature data 112 can include weighted average values as a result of weighting the temperatures closer to the current year among the temperatures in multiple years in the past.

Returning to FIG. 2, the actual performance data 113 are data presenting the actual performance values of the daily power usage of the air conditioner 20.

The electric energy calculation reference table 114 is a table that is referred to for obtaining the power usage of the air conditioner 20.

Here, FIGS. 4A and 4B show examples of the electric energy calculation reference table 114. FIG. 4A is a chart showing an example of the electric energy calculation reference table 114 when the air conditioner 20 operates in the heating mode. For example, it can be known from this chart that the power usage is 7.8 kwh if the air conditioner 20 operates in the heating mode with a set temperature of 16° C. when the lowest temperature is 0° C.

On the other hand, FIG. 4B is a chart showing an example of the electric energy calculation reference table 114 when the air conditioner 20 operates in the air-conditioning mode. For example, it can be known from this chart that the power usage is 7.0 kwh if the air conditioner 20 operates in the air-conditioning mode with a set temperature of 24° C. when the highest temperature is 28° C.

Returning to FIG. 2, the daily schedule data 115 and current day schedule data 116 are data that are created and updated by the schedule creator 16 and present the available electric energy of the air conditioner 20 on a daily basis for the year and on a time window basis for the current day, respectively. For example, FIG. 5A shows an example of the daily schedule data 115 and FIG. 5B shows an example of the current day schedule data 116.

Returning to FIG. 2, the target setter 12 creates (sets) target data 111 presenting a target value of the annual power usage of the air conditioner 20 based on instruction from the user and stores the target data 111 in the information storage 11.

The weather forecast acquirer 13 acquires latest weather forecast data from the weather forecast system 50 via the network N1 and stores the acquired weather forecast data in the weather forecast data storage 14. Here, there are four kinds of weather forecast data depending on the forecast time span (forecast period): weather forecast data (three months) 141, weather forecast data (one month) 142, weather forecast data (one week) 143, and weather forecast data (current day) 144. The weather forecast acquirer 13 acquires the weather forecast data 141 to 144 at different times.

The weather forecast data (three months) 141 are data presenting the weather forecast for each month of the next three months. For example, the weather forecast data (three months) 141 include data presenting the results of comparison between the monthly forecast temperatures for April through June and the temperatures of the same period of a normal year, "low," "average," and "high," in rate (%) as shown in FIG. 6A. Incidentally, the weather forecast acquirer 13 acquires the weather forecast data (three months) 141 on a monthly basis and stores the weather forecast data (three months) 141 in the weather forecast data storage 14. In other words, the weather forecast data (three months) 141 stored in the weather forecast data storage 14 are updated to the latest data on a monthly basis.

The weather forecast data (one month) 142 are data presenting the weather forecast for the first, second, and third/fourth weeks of the next one month. For example, the weather forecast data (one month) 142 include data presenting the results of comparison between the forecast temperatures for the first, second, and third/fourth weeks of April and the temperatures of the same period of a normal year, "low," "average," and "high," in rate (%) as shown in FIG. 6B. Incidentally, the weather forecast data (one month) 142 stored in the weather forecast data storage 14 are updated to the latest data on a weekly basis.

The weather forecast data (one week) 143 are data presenting the weather forecast for each day of the next week. For example, the weather forecast data (one week) 143 include data presenting reliability and forecast highest and lowest temperatures of the 1st through 7th of April as shown in FIG. 6C. Here, the reliability is information presenting the degree of the forecast being unlikely to change (degree of certainty of the forecast) and set to "A," "B," or "C" in the order of degree of certainty of the forecast from the highest. Incidentally, the weather forecast data (one week) 143 stored in the weather forecast data storage 14 are updated to the latest data on a daily basis.

The weather forecast data (current day) 144 are data presenting the weather forecast for the current day. For example, the weather forecast data (current day) 144 include data presenting the forecast temperatures at every three hours on the 1st of April as shown in FIG. 6D. Incidentally, the weather forecast data (current day) 144 stored in the weather forecast data storage 14 are updated to the latest data at 5, 11, and 17 o'clock.

Returning to FIG. 2, the actual performance acquirer 15 accumulates the power consumption of the air conditioner 20 successively measured by the power measuring sensor 30 to calculate the daily power usage and updates the actual performance data 113.

The schedule creator 16 creates an optimum schedule for operating the air conditioner 20 with the annual power usage presented by the target data 111 based on various data and tables stored in the information storage 11 and the weather forecast data stored in the weather forecast data storage 14. The schedule creator 16 comprises a standard schedule creator 161, a seasonal schedule updater 162, a monthly schedule updater 163, a weekly schedule updater 164, and a current day schedule updater 165.

The standard schedule creator 161 creates an annual target-achievable daily operation schedule (standard schedule) of the air conditioner 20 that serves as the standard (base) for the update in the subsequent procedures. Incidentally, the standard schedule is the schedule created without making reference to the weather forecast data.

The seasonal schedule updater 162 updates the schedule for the next three months based on the weather forecast data (three months) 141.

The monthly schedule updater 163 updates the schedule for the next one month based on the weather forecast data (one month) 142.

The weekly schedule updater 164 updates the schedule for the next one week based on the weather forecast data (one week) 143.

The current day schedule updater 165 updates the schedule for the current day based on the weather forecast data (current day) 144.

Returning to FIG. 2, the air-conditioning controller 17 controls the operation of the air conditioner 20 by periodically sending control signals to the air conditioner 20 so that the air conditioner 20 operates with the available electric energy defined by the daily schedule data 115 and current day schedule data 116.

Operation of the air-conditioning management device 10 will be described hereafter.

(Standard Schedule Creation Procedure)

Figure 7:
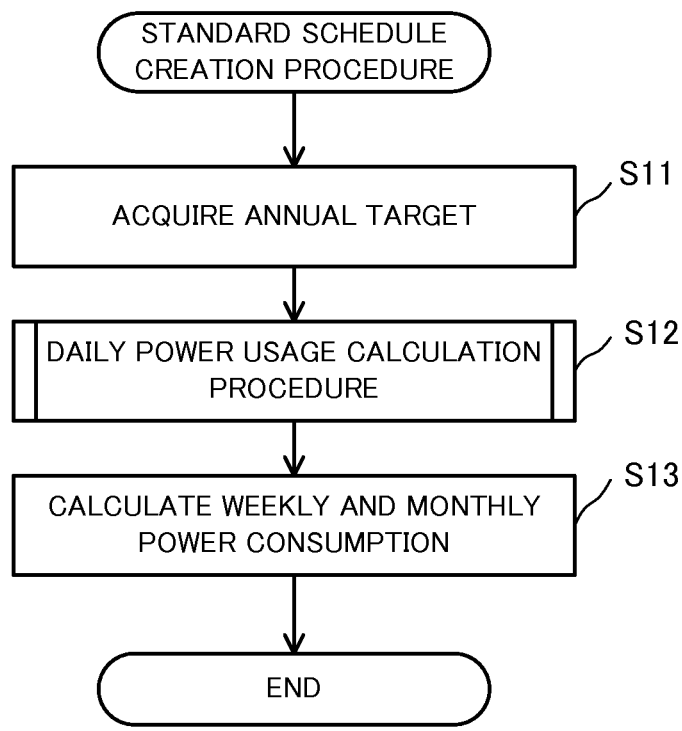
FIG. 7 is a flowchart for explaining the operation in the standard schedule creation procedure.

First, the operation in the standard schedule creation procedure will be described. For example, on the first day of a fiscal year (for example, April 1st), a user who is the building administrator operates a not-shown operator of the air-conditioning management device 10 to enter this fiscal year's annual target of the total power usage of the air conditioner 20. The target setter 12 of the air-conditioning management device 10 creates target data 111 from the annual target entered by the user and stores the target data 111 in the information storage 11. As the target data 111 are stored in the information storage 11, the standard schedule creator 161 executes the standard schedule creation procedure to create a standard schedule for achieving the annual target as shown in FIG. 7. Here, the following explanation will be made on the assumption that a fiscal year starts on April 1st and ends on March 31st.

First, the standard schedule creator 161 acquires the annual target entered by the user (Step S11). For example, if the user enters an annual target "1500 kwh," the standard schedule creator 161 can acquire this value as the annual target. Alternatively, the standard schedule creator 161 can set the value entered by the user from which a given margin (for example, 10%) is subtracted as the annual target. Alternatively, if the user enters "the previous year −10%," the standard schedule creator 161 can acquire the actual performance value of the annual power usage in the previous year from which 10% is subtracted as the annual target.

Subsequently, the standard schedule creator 161 executes the daily power usage calculation procedure to obtain the daily power usage that makes it possible to achieve the acquired annual target (Step S12).

Figure 8:
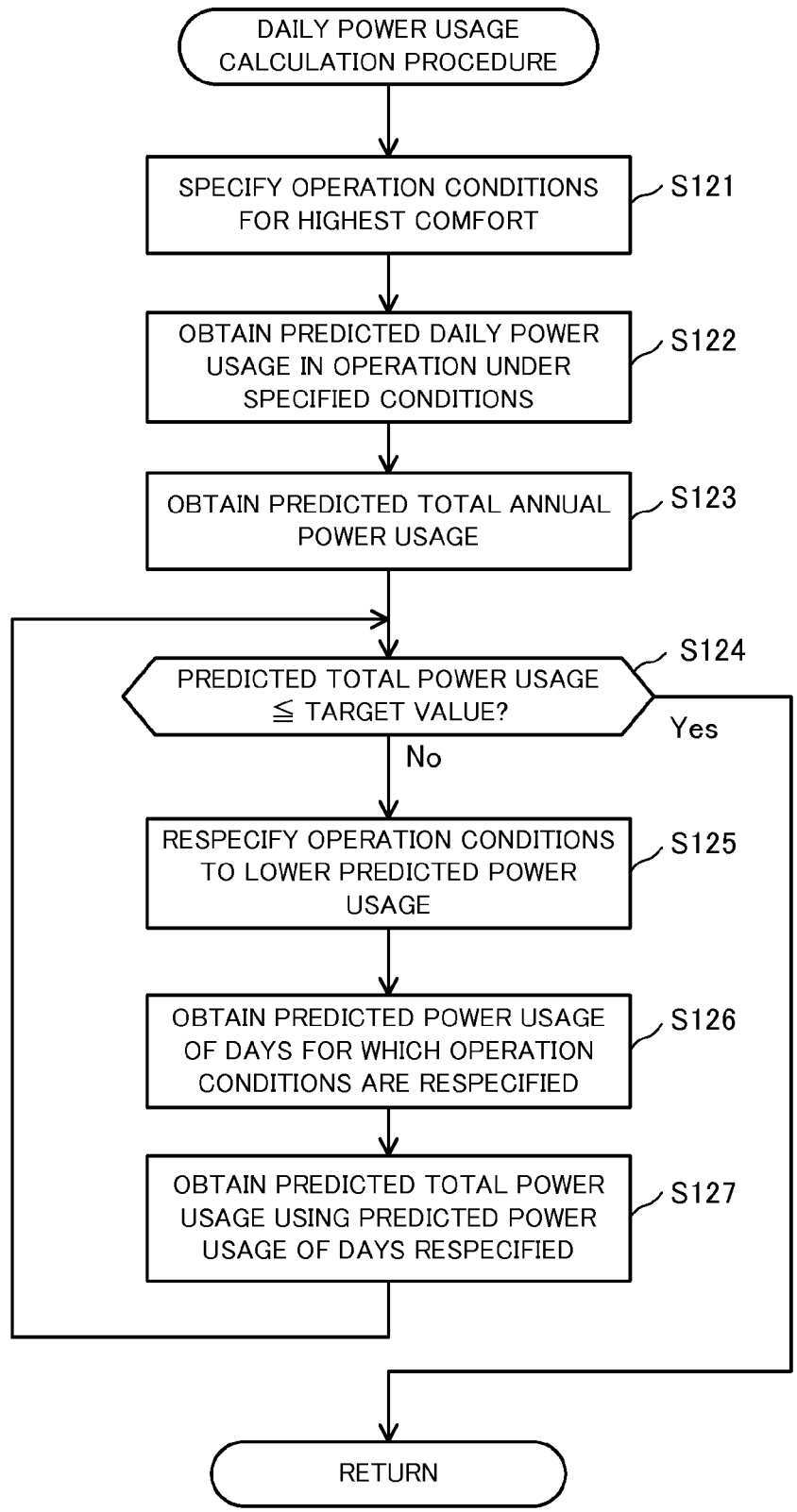
FIG. 8 is a flowchart for explaining the operation in the daily power usage calculation procedure.

The daily power usage calculation procedure will be described in detail with reference to FIG. 8.

First, the standard schedule creator 161 specifies operation conditions of the air conditioner 20 for the highest comfort (Step S121). In this embodiment, the operation conditions of the air conditioner 20 for the highest comfort comprise a set temperature of 22° C. when the air conditioner 20 operates in the heating mode and a set temperature of 24° C. when the air conditioner 20 operates in the air-conditioning mode.

Subsequently, the standard schedule creator 161 makes reference to the average temperature data 112 and electric energy calculation reference table 114 and obtains the predicted power usage of each day of the year when the air conditioner 20 operates under the specified operation conditions (set temperatures) (Step S122), Here, the predicted power usage is obtained on the assumption that the highest temperature and lowest temperature of each day of the year are equal to the highest temperature and lowest temperature presented by the average temperature data 112.

Subsequently, the standard schedule creator 161 totals the obtained, predicted power usage of each day to obtain the predicted annual total power usage when the air conditioner 20 operates under the specified operation conditions (Step S123).

Subsequently, the standard schedule creator 161 determines whether the obtained, predicted annual total power usage is equal to or lower than the annual target acquired in the Step S11 (Step S124).

If the predicted total power usage is not equal to or lower than the annual target (Step S124: No), the standard schedule creator 161 respecifies (changes) the operation conditions to lower the predicted power usage (Step S125). For example, the standard schedule creator 161 lowers the heating mode set temperature specified earlier by 1° C. or raises the air-conditioning mode set temperature by 1° C. for the days meeting given conditions.

Incidentally, in doing so, the standard schedule creator 161 makes reference to the tables giving a priority level to each combination of an outdoor temperature and a set temperature of the air conditioner 20 as shown in FIGS. 9A and 9B and selects the days for which the operation conditions are respecified in the order of priority level defined in the tables. Incidentally, it is desirable to give the priority levels in consideration of comfort to the user.

Returning to FIG. 8, subsequently, the standard schedule creator 161 obtains the predicted power usage for the days for which the operation conditions are respecified (changed) (Step S126). Using the results, the standard schedule creator 161 obtains the predicted annual total power usage again (Step S127). Then, the standard schedule creator 161 determines whether the predicted total power usage is equal to or lower than the annual target again (Step S124). The above processing is repeated until the predicted total power usage becomes equal to or lower than the annual target.

If the predicted total power usage is equal to or lower than the annual target (Step S124; Yes), a target-achievable daily schedule is created and the daily power usage calculation procedure ends.

Returning to FIG. 7, after the daily power usage calculation procedure ends, the standard schedule creator 161 creates daily schedule data 115 presenting the power usage of each day obtained in the Step S122 as the available electric energy and stores the daily schedule data 115 in the information storage 11 (Step S13). Then, the standard schedule creation procedure ends.

As described above, an operation schedule of the air conditioner 20 that makes it possible to achieve the set annual target is created through the standard schedule creation procedure. Incidentally, the schedule created here is the schedule created based on the past average temperature data 112 and the like and the weather forecast data for this fiscal year is not reflected yet.

(Schedule Update Procedure)

Figure 10:
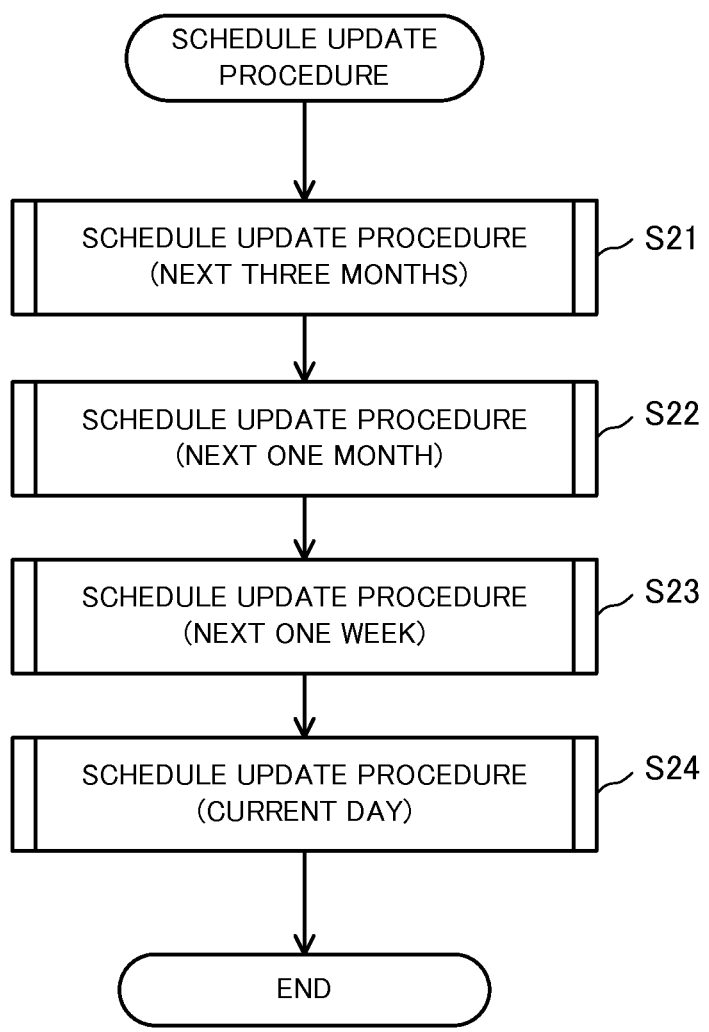
FIG. 10 is a flowchart for explaining the operation in the schedule update procedure.

Subsequently, the schedule update procedure to update the schedule of the air conditioner 20 based on weather forecast data will be described with reference to the flowchart of FIG. 10.

The schedule creator 16 executes the schedule update procedure each time the weather forecast acquirer 13 acquires latest weather forecast data from the weather forecast system 50 and updates data in the weather forecast data storage 14.

First, the seasonal schedule updater 162 of the schedule creator 16 executes the schedule update procedure (next three months) to update the schedule of the air conditioner 20 for the next three months based on the weather forecast data (three months) 141 stored in the weather forecast data storage 14 (Step S21).

Figure 11:
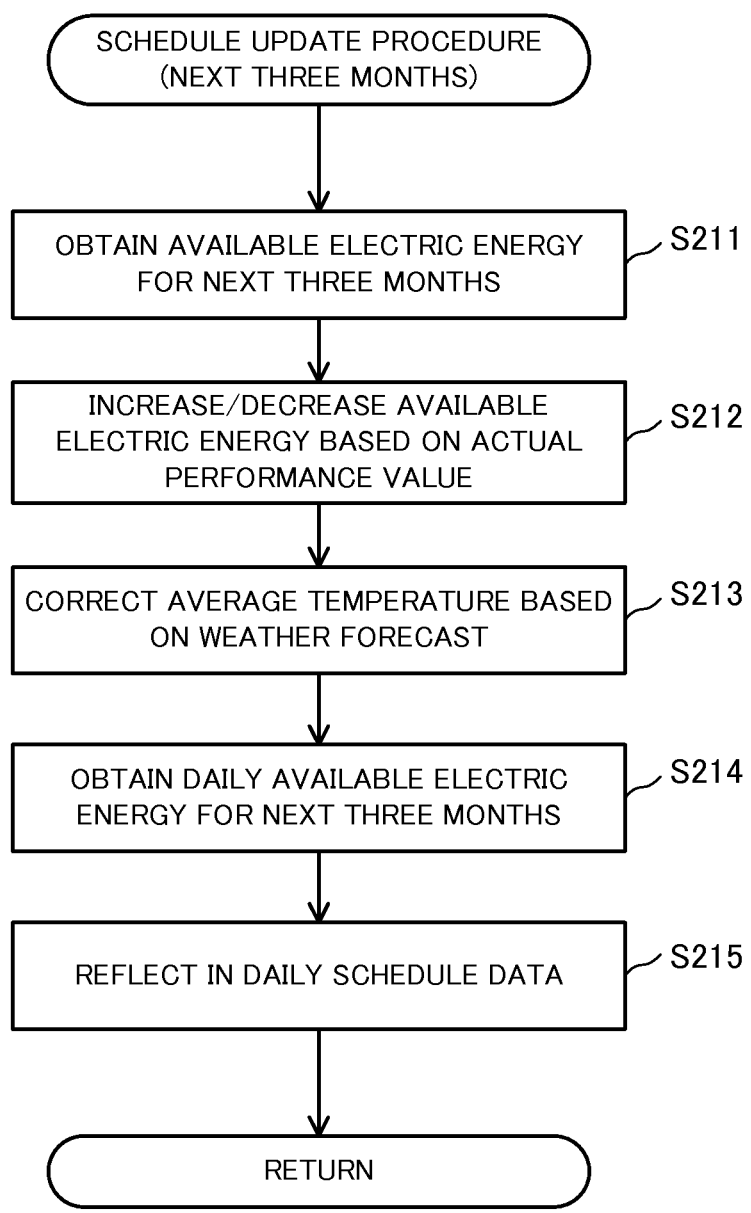
FIG. 11 is a flowchart for explaining the operation in the schedule update procedure (next three months)

Here, the schedule update procedure (next three months) will be described with reference to the flowchart of FIG. 11.

First, the seasonal schedule updater 162 makes reference to the daily schedule data 115 and obtains the available electric energy for the next three months (Step S211).

Subsequently, the seasonal schedule updater 162 compares the total actual performance value of the power usage with the total available electric energy from the first month (April) of the fiscal year to the previous month and if the total actual performance value exceeds the total available electric energy, subtracts the excess from the total value obtained in the Step S211. On the other hand, if the total available electric energy exceeds the total actual performance value, the seasonal schedule updater 162 adds the excess to the total value obtained in the Step S211 (Step S212). The value obtained in the Step S212 is the target value of the power usage of the air conditioner 20 for the next three months.

Figure 12:
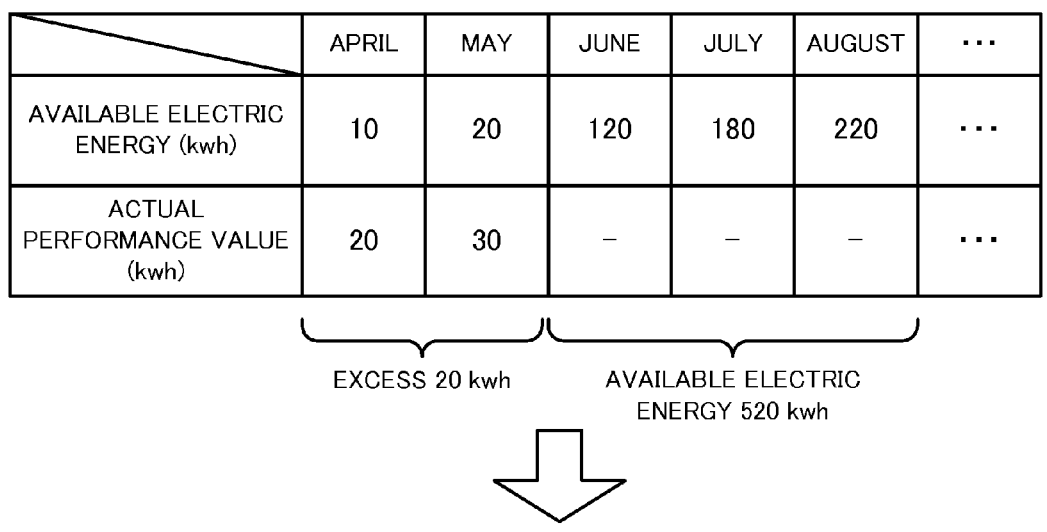
FIG. 12 is a chart for explaining how the actual performance values are reflected in setting a target value of the power usage.

Here, the processing of the Steps S211 and S212 will be described with reference to FIG. 12. This figure shows the relationship between the available electric energy and actual performance value in each month from the first month (April) of the fiscal year. Incidentally, the available electric energy of each month can be obtained from the daily schedule data 115 and the actual performance value can be obtained from the actual performance data 113.

In the case shown in the figure, assuming that the current month is June, the total available electric energy for the next three months (namely June through August) is 520 kwh. The total available electric energy for April through May is 30 kwh. The total actual performance value is 50 kwh. Therefore, in this case, the total actual performance value exceeds the total available electric energy by 20 kwh. With the excess of 20 kwh being subtracted, the reminder of 500 kwh is the target value of the power usage of the air conditioner 20 for the next three months.

Returning to FIG. 11, subsequently, the seasonal schedule updater 162 corrects the average temperatures of each day of the next three months that are defined by the average temperature data 112 based on the weather forecast data (three months) 141 (Step S213).

For example, if the weather forecast data (three months) 141 are the data as shown in FIG. 6A, the seasonal schedule updater 162 obtains a correction value from the rates (%) of the temperature forecast "low," "average," and "high" of each month based on given rules, and corrects the average temperatures of each day of the next three months.

More specifically, a table associating the rates of the temperature forecast "low," "average," and "high" in the weather forecast data (three months) 141 with correction values as shown in FIG. 13 is retained and the correction value associated with the forecast is used to correct the temperatures of each day of the month. For example, it is assumed that the weather forecast data (three months) 141 predicts that the temperature in August will be "low: average: high"="100: 0: 0." In such a case, with reference to the table shown in FIG. 13, the seasonal schedule updater 162 corrects the temperatures of each day in August defined by the average temperature data 112 to values lower by 2° C.

Incidentally, the correction values given in the temperature correction table shown in FIG. 13 are calculated by the formula below:

$$\text{Correction value} = \text{difference} + \text{variation of difference}/2$$

in which the "difference" presents the temperature difference in comparison with a normal year. The "difference" is calculated by subtracting the numeric value of the weather forecast "low" from the numeric value of the "high" and multiplying the remainder by 0.025. However, the "difference" does not fall outside a range from −0.2 to +0.2.

Furthermore, the "variation of difference" in the above formula presents to what extent the value of the "difference" varies. The "variation of difference" is calculated by the formula below:

$$\text{Variation of difference} = -(\text{numeric value of forecast "average"} + \text{numeric value of "high"} * 2)/100$$
when the "difference" is negative;

Variation of difference=0 when the "difference" is 0; and $$\text{Variation of difference} = +(\text{numeric value of forecast "average"} + \text{numeric value of "low"} * 2)/100$$ when the "difference" is positive.

Returning to FIG. 11, subsequently, the seasonal schedule updater 162 obtains the daily available electric energy that makes it possible to achieve the target power usage for the next three months obtained in the Step S212 from the corrected average temperature data 112 (Step S214). Incidentally, this processing can be executed by the same scheme as in the daily power consumption calculation procedure shown in FIG. 8. In other words, the seasonal schedule updater 162 first specifies operation conditions of the air conditioner 20 for the highest comfort, and obtains the total power usage for the next three months with reference to the corrected average temperature data 112 and power usage calculation reference table 114. Then, if the obtained, total power usage is not equal to or lower than the target obtained in the Step S212, the seasonal schedule updater 162 respecifies the operation conditions to lower the power usage. With the operation conditions being repeatedly respecified until the total power usage becomes equal to or lower than the target, the daily power usage for the next three months that makes the total power usage equal to or lower than the target can be obtained.

Subsequently, the seasonal schedule updater 162 reflects the daily available electric energy obtained in the Step S214 in the daily schedule data 115 (Step S215). In other words, as a result of this processing, the schedule for the next three months in the annual schedule is updated to the schedule in which the weather forecast data (three months) 141 are reflected. Then, the schedule update procedure (next three months) ends.

Returning to FIG. 10, after the schedule update procedure (next three months) (Step S21) ends, subsequently, the monthly schedule updater 163 executes the schedule update procedure (next one month) to update the schedule of the air conditioner 20 for the next one month based on the weather forecast data (one month) 142 (Step S 22).

Figure 14:
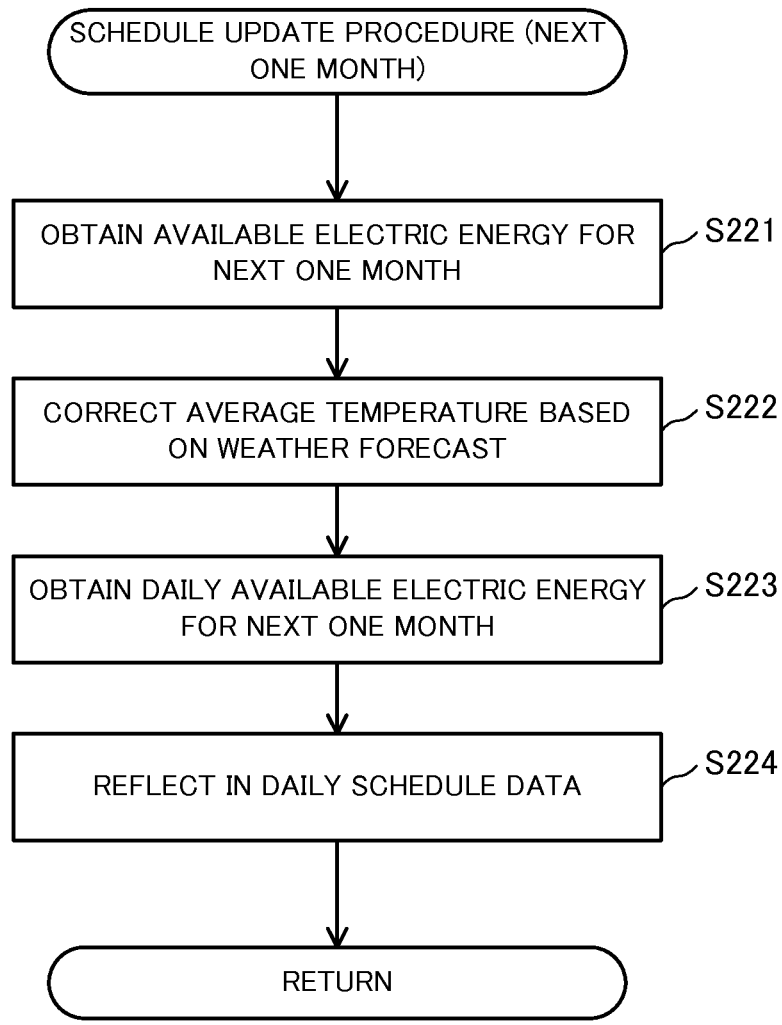
FIG. 14 is a flowchart for explaining the operation in the schedule update procedure (next one month)

Here, the schedule update procedure (next one month) will be described with reference to the flowchart of FIG. 14. First, the monthly schedule updater 163 makes reference to the daily schedule data 115 and obtains the available electric energy for the next one month targeted (Step S221). The value obtained in this processing is the target value of the power usage of the air conditioner 20 for the next one month.

Subsequently, the monthly schedule updater 163 corrects the average temperatures of each day in the next one month defined by the average temperature data 112 based on the weather forecast data (one month) 142 (Step S222). As shown in FIG. 6B, the weather forecast data (one month) 142 presents the temperature forecast "low," "average," and "high" in rate (%). Therefore, the average temperatures can be corrected by the same scheme as in the Step S213 of the above-described schedule update procedure (next three months).

Subsequently, the monthly schedule updater 163 obtains the daily available electric energy that makes it possible to achieve the target of the power usage for the next one month obtained in the Step S221 from the corrected average temperature data 112 (Step S223). Incidentally, this processing can be executed by the same scheme as in the daily power consumption calculation procedure shown in FIG. 8.

Subsequently, the monthly schedule updater 163 reflects the daily available electric energy obtained in the Step S223 in the daily schedule data 115 (Step S224). In other words, as a result of this processing, the schedule for the next one month in the annual schedule is updated to the schedule in which the weather forecast data (one month) 142 are reflected. Then, the schedule update procedure (next one month) ends.

Returning to FIG. 10, after the schedule update procedure (next one month) (Step S22) ends, subsequently, the weekly schedule updater 164 executes the schedule update procedure (next one week) to update the schedule of the air conditioner 20 for the next one week based on the weather forecast data (one week) 143 (Step S23).

Figure 15:
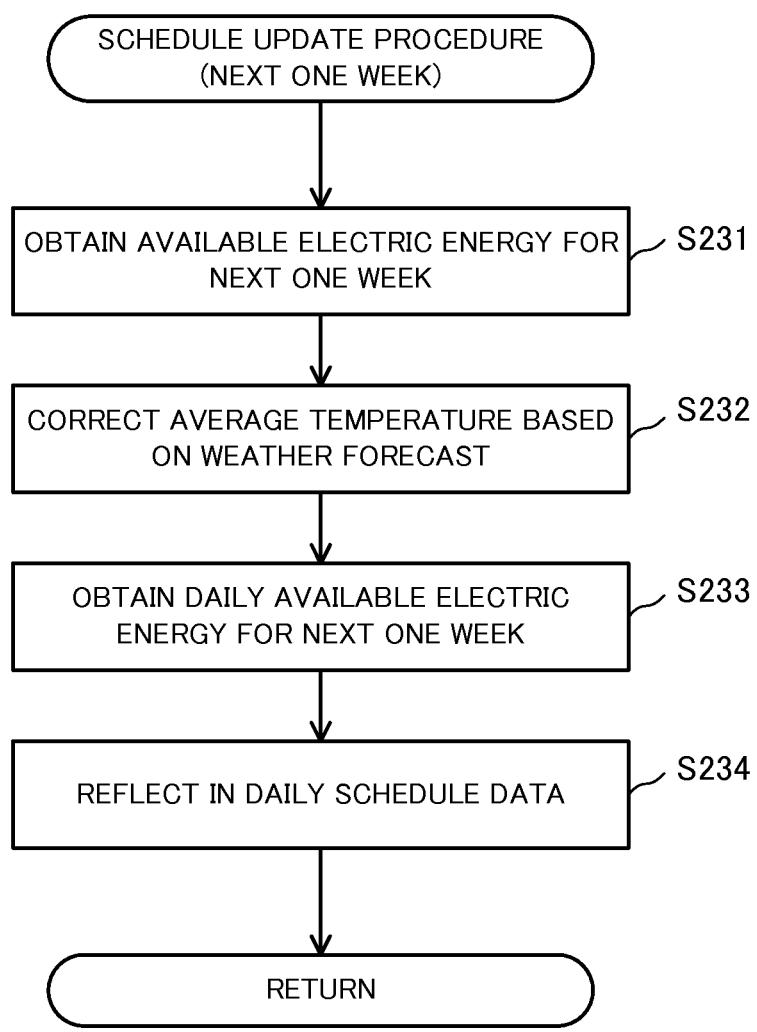
FIG. 15 is a flowchart for explaining the operation in the schedule update procedure (next one week)

Here, the schedule update procedure (next one week) will be described with reference to the flowchart of FIG. 15. First, the weekly schedule updater 164 makes reference to the daily schedule data 115 and obtains the available electric energy for the next one week targeted (Step S231). The value obtained in this processing is the target value of the power usage of the air conditioner 20 for the next one week.

Subsequently, the weekly schedule updater 164 corrects the average temperatures of each day in the next one week defined by the average temperature data 112 based on the weather forecast data (one week) 143 (Step S232). As shown in FIG. 6C, the weather forecast data (one week) 143 presents the highest temperature and lowest temperature of each day. Therefore, the temperatures of the average temperature data 112 are updated to these highest temperature and lowest temperature.

Subsequently, the weekly schedule updater 164 obtains the daily available electric energy that makes it possible to achieve the target of the power usage for the next one week obtained in the Step S231 from the corrected average temperature data 112 (Step S233). Incidentally, this processing can be executed by the same scheme as in the daily power consumption calculation procedure shown in FIG. 8.

Subsequently, the weekly schedule updater 164 reflects the daily available electric energy obtained in the Step S233 in the daily schedule data 115 (Step S234). In other words, as a result of this processing, the schedule for the next one week in the annual schedule is updated to the schedule in which the weather forecast data (one week) 143 are reflected. Then, the schedule update procedure (next one week) ends.

Returning to FIG. 10, after the schedule update procedure (next one week) (Step S23) ends, subsequently, the current day schedule updater 165 executes the schedule update procedure (current day) to update the operation schedule of the air conditioner 20 for the current day based on the weather forecast data (current day) 144 (Step S24).

Figure 16:
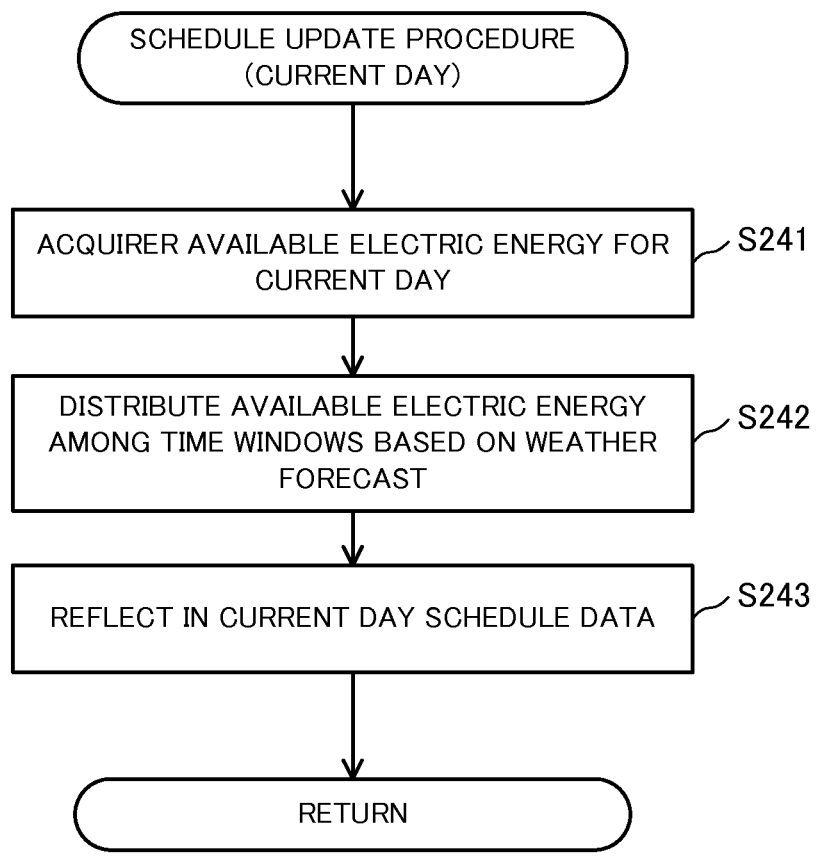
FIG. 16 is a flowchart for explaining the operation in the schedule update procedure (current day).

Here, the schedule update procedure (current day) will be described with reference to the flowchart of FIG. 16. First, the current day schedule updater 165 makes reference to the daily schedule data 115 and obtains the available electric energy for the current day targeted (Step S241). The value obtained in this processing is the target value of the power usage of the air conditioner 20 for the current day.

Subsequently, the current day schedule updater 165 distributes the available electric energy acquired in the Step S241 among the time windows based on the forecast temperature change through the day presented by the weather forecast data (current day) 144 (Step S242). For example, the current day schedule updater 165 weights the time windows according to the forecast temperatures and distributes the available electric energy according to the weighted ratio.

Subsequently, the current day schedule updater 165 reflects the available electric energy to each time window obtained in the Step S242 in the current day schedule data 116 (Step S243). In other words, as a result of this processing, the current day schedule in the annual schedule is updated to the schedule in which the weather forecast data (current day) 144 are reflected. Then, the schedule update procedure (current day) ends.

Returning to FIG. 10, after the schedule update procedure (current day) ends, the schedule update procedure ends.

As described in detail above, the air-conditioning management device 10 according to the embodiment of the present disclosure automatically creates an operation schedule of the air conditioner 20 that makes it possible to achieve the energy saving target using multiple pieces of weather forecast for different forecast periods. Thus, an operation schedule of the air conditioner 20 can properly be created from the weather forecast. Furthermore, the air-conditioning management device 10 according to the embodiment of the present disclosure makes it possible to control the air conditioner 20 properly based on the created schedule.

Furthermore, in creating an operation schedule, the air-conditioning management device 10 according to the embodiment of the present disclosure gradually refines the conditions from the conditions for the highest comfort to the user and eventually creates a target-achievable schedule. Thus, it is possible to create an operation schedule of the air conditioner 20 in consideration of the comfort to the user to the utmost extent. Furthermore, the air-conditioning management device 10 according to the embodiment of the present disclosure creates an operation schedule of the air conditioner 20 in consideration of long-term weather forecast. Thus, it is possible to create a schedule that does not diminish the comfort to the user in a long time span as much as possible.

Furthermore, the air-conditioning management device 10 according to the embodiment of the present disclosure creates a schedule for the next three months in consideration of the difference between the actual total power usage to the present and the target (available electric energy) in updating the schedule using the weather forecast data (three months) 141 for the longest forecast period. Thus, it is possible to create a schedule in which the actual usage is reflected.

Furthermore, the air-conditioning management device 10 according to the embodiment of the present disclosure starts the schedule update procedure when any of the weather forecast data 141 to 144 are acquired. Thus, it is possible to create a schedule in which the latest weather forecast data are reflected on a real time basis.

Incidentally, the present disclosure is not confined by the above-described embodiment and drawings. Needless to say, the embodiment and drawings can be modified to the extent that the gist of the present disclosure is not changed.

For example, in the above-described embodiment, a schedule is created using four kinds of weather forecast data for forecast periods of three months, one month, one week, and the current day. The present disclosure can be realized using weather forecast data for other forecast periods.

Furthermore, in the above-described embodiment, a schedule for one year is created. The present disclosure is applicable to creation of an air conditioner operation schedule for six months, for two years or the like.

Furthermore, in the above-described embodiment, a target for the electric energy used by the air conditioner is set and a schedule that makes it possible to achieve the target is created. However, it is possible to set a target for another kind of energy consumed by the air conditioner and create a schedule of the energy.

Furthermore, for example, an existing personal computer, information terminal device, or the like can be made to function as the air-conditioning management device 10 according to the present disclosure by applying the operation programs defining the operation of the air-conditioning management device 10 according to the present disclosure to the existing personal computer or the like.

The above programs can be distributed by any method and, for example, stored and distributed on a computer-readable non-transitory recording medium such as a CD-ROM (compact disk read only memory), DVD (digital versatile disk), MO (magneto optical disk), and memory card, or distributed via a communication network such as the Internet.

Various embodiments and modifications are available to the present disclosure without departing from the broad sense of spirit and scope of the present disclosure. The above-described embodiment is given for explaining the present disclosure and does not confine the scope of the present disclosure. In other words, the scope of the present disclosure is set forth by the scope of claims, not by the embodiment. Various modifications made within the scope of claims and scope of significance of the disclosure equivalent thereto are considered to fall under the scope of the present disclosure.

INDUSTRIAL APPLICABILITY

The present disclosure is preferably applicable to an air-conditioning controller managing an air conditioner installed in a building or the like.

REFERENCE SIGNS LIST

10 Air-conditioning management device
11 Information storage
111 Target data
112 Average temperature data
113 Actual performance data
114 Electric energy calculation reference table
115 Daily schedule data
116 Current day schedule data
12 Target setter
13 Weather forecast acquirer
14 Weather forecast data storage
141 Weather forecast data (three months)
142 Weather forecast data (one month)
143 Weather forecast data (one week)
144 Weather forecast data (current day)
15 Actual performance acquirer
16 Schedule creator
161 Standard schedule creator
162 Seasonal schedule updater
163 Monthly schedule updater
164 Weekly schedule updater
165 Current day schedule updater
17 Air-conditioning controller
20 Air conditioner
30 Power measuring sensor
40 Power line
N1 Network

The invention claimed is:

1. An air-conditioning management device, comprising:
a central processing unit, including
 a setter setting a target for energy used by an air conditioner for a schedule-creation period;
 a creator creating a standard operation schedule of the air conditioner that achieves the target set by the setter;
 an acquirer acquiring multiple weather forecast data for different forecast periods; and
 an updater updating the standard operation schedule using the acquired multiple weather forecast data in an order of forecast period from a longest forecast period.

2. The air-conditioning management device according to claim 1, wherein
in updating the standard schedule using a piece of weather forecast data selected from the multiple weather forecast data for the longest forecast period, the updater updates the standard operation schedule in consideration of the difference between an actual usage of energy to a present time and the target.

3. The air-conditioning management device according to claim 1, wherein
the updater updates the standard operation schedule at times when the acquirer acquires the weather forecast data.

4. The air-conditioning management device according to claim 1, comprising a controller controlling the air conditioner based on the standard operation schedule updated by the updater.

5. The air-conditioning management device according to claim 1, wherein
the creator creates, as the standard operation schedule, daily schedule data that indicates energy usage for each day of the schedule-creation period based on average temperatures of a same period of an average year as the schedule-creation period, the average temperatures including a subset of average temperatures for each day of the forecast periods corresponding to the respective weather forecast data, and the updater corrects the subset of average temperatures based on a piece of weather forecast data selected from the multiple weather forecast data, and determines energy usage for each day of the forecast periods based on the corrected subset of average temperatures to update the daily schedule data.

6. The air-conditioning management device according to claim 5, wherein the updater corrects the subset of average temperatures with reference to a table in which a forecast value of the piece of weather forecast data is associated with a correction value.

7. The air-conditioning management device according to claim 6, wherein the forecast value of the piece of weather forecast data indicates a possibility of whether the subset of average temperatures is lower than, equal to or higher than the average temperatures of the same period of the average year, and the correction value is calculated based on: a first index determined based on a difference between a possibility that a temperature indicated by the forecast value is higher and a possibility that the temperature indicated by the forecast value is lower; and a second index that indicates an error of the first index, the error of the first index being determined based on a possibility that the temperature indicated by the forecast value is equal to the average temperatures of the same period of the average year.

8. The air-conditioning management device according to claim 1, wherein the acquirer acquires the weather forecast data for forecast periods of three months, one month, one week, and a current day.

9. The air-conditioning management device according to claim 1, wherein the setter sets, as the target, a value obtained by subtracting a predetermined ratio from a value input by a user.

10. The air-conditioning management device according to claim 1, further comprising a communication interface configured to work with the acquirer to acquire the multiple weather forecast data from an external network.

11. The air-conditioning management device according to claim 1, further comprising a computer memory configured to store the standard operation schedule.

12. An air-conditioning management method, comprising:

a setting step of setting a target for energy used by an air conditioner for a schedule-creation period;

a creation step of creating a standard operation schedule of the air conditioner that achieves the target set in the target setting step;

an acquisition step of acquiring multiple weather forecast data for different forecast periods; and an update step of updating the standard operation schedule using the acquired multiple weather forecast data in an order of forecast period from a longest forecast period.

13. A non-transitory computer-readable recording medium storing a program allowing a computer to function as:

a setter setting a target for energy used by an air conditioner for a schedule-creation period;

a creator creating a standard operation schedule of the air conditioner that achieves the target set by the setter;

an acquirer acquiring multiple weather forecast data for different forecast periods; and an updater updating the standard operation schedule using the acquired multiple weather forecast data in an order of forecast period from a longest forecast period.

* * * * *